United States Patent
Zhang (10) Patent No.: US 11,363,207 B2
(45) Date of Patent: Jun. 14, 2022

(54) PHOTOGRAPHING METHOD FOR COMPENSATING DYNAMIC SCENES AND A CAMERA DEVICE USING THE SAME

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventor: Yu Zhang, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 116 days.

(21) Appl. No.: 17/034,280

(22) Filed: Sep. 28, 2020

(65) Prior Publication Data

US 2021/0344844 A1 Nov. 4, 2021

(30) Foreign Application Priority Data

Apr. 30, 2020 (CN) .......................... 202010368088.8

(51) Int. Cl.
| | |
|---|---|
| *H04N 5/225* | (2006.01) |
| *H04N 5/232* | (2006.01) |
| *G06T 5/20* | (2006.01) |
| *G06T 5/50* | (2006.01) |
| *G06N 5/00* | (2006.01) |
| *G06T 7/73* | (2017.01) |

(52) U.S. Cl.
CPC ....... *H04N 5/232935* (2018.08); *G06N 5/003* (2013.01); *G06T 5/20* (2013.01); *G06T 5/50* (2013.01); *G06T 7/74* (2017.01); *H04N 5/23296* (2013.01); *G06T 2207/20016* (2013.01); *G06T 2207/20021* (2013.01); *G06T 2207/20081* (2013.01); *G06T 2207/20221* (2013.01)

(58) Field of Classification Search
CPC ......... H04N 5/232935; H04N 5/23296; H04N 5/23218; H04N 5/23229; G06N 5/003; G06T 5/20; G06T 5/50; G06T 7/74; G06T 2207/20016; G06T 2207/20021; G06T 2207/20081; G06T 2207/20221; G06T 5/003
USPC .................................................... 348/207.99
See application file for complete search history.

(56) References Cited

U.S. PATENT DOCUMENTS

2010/0053321 A1* 3/2010 Kim ................... H04N 5/23229 348/135

* cited by examiner

*Primary Examiner* — Stephen P Coleman
(74) *Attorney, Agent, or Firm* — ScienBiziP, P.C.

(57) ABSTRACT

In capturing images, a method applied in a camera device taking images of a dynamic scenes which provides compensation for blurring and lack of clarity caused by movement of objects within the scene. From images captured in preview mode, determining whether a target object is a dynamic object. A preset number of the preview images are stored as first images of a target object determined as being dynamic, and a second image is also taken, the second image being analyzed for an area of fuzziness. The camera device takes feature information from each first image and the feature information corresponding to the area of fuzziness of the second image and combines feature information having a highest similarity with the fuzzy area to generate a final target image with sharpness and full clarity, and outputting the target image.

20 Claims, 4 Drawing Sheets

PHOTOGRAPHING METHOD FOR COMPENSATING DYNAMIC SCENES AND A CAMERA DEVICE USING THE SAME

CROSS-REFERENCE TO RELATED APPLICATIONS

This application claims priority to Chinese Patent Application No. 202010368088.8 filed on Apr. 30, 2020, the contents of which are incorporated by reference herein.

FIELD

The subject matter herein generally relates to image processing, especially to a photographing method for compensating dynamic scenes and a camera device.

BACKGROUND

A traditional camera will focus and then take an image and the image taken at the optimal focus position is generally clear. However, when taking an image of a scene that includes movement, the image or parts of the image can be blurred due to lack of detail in the scene. When capturing images, a preview image is usually previewed first, and the preview image is temporarily saved in preview mode. As a frame rate of the preview image is usually 30 frames per second or 60 frames per second, the motion of an object in the preview image is usually clear, and a user can observe the motion of the moving object by the preview mode and then capture permanent images. However, in order to reduce memory, the preview images are not stored in the camera. It is only the temporarily saved preview images that record the moving motion and the details of the moving object.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
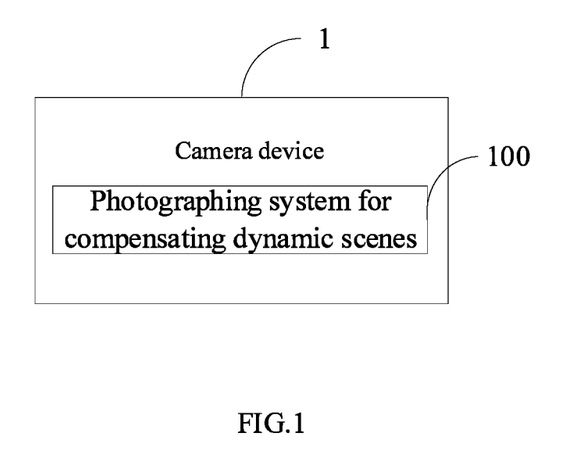
FIG. 1 is a block diagram of an embodiment of a running environment of a photographing method for compensating dynamic scenes.

FIG. 1 illustrates a running environment of a photographing method for compensating dynamic scenes when capturing images. The method is applied in a camera device 1. The camera device 1 includes a photographing system 100 for compensating dynamic scenes. The system 100 determines whether there is a moving or shape-changing object (dynamic object) in a preview image of the camera device 1 in the preview mode, and identifies a fuzzy area in an image taken by the camera device 1 when the preview image includes the dynamic object. The system 100 further determines a clear-featured image corresponding to a position of the fuzzy area from the preview image and combines the clear-featured image with the photographing image to generate a target image, so as to apply compensation for the dynamic scenes.

Figure 2:
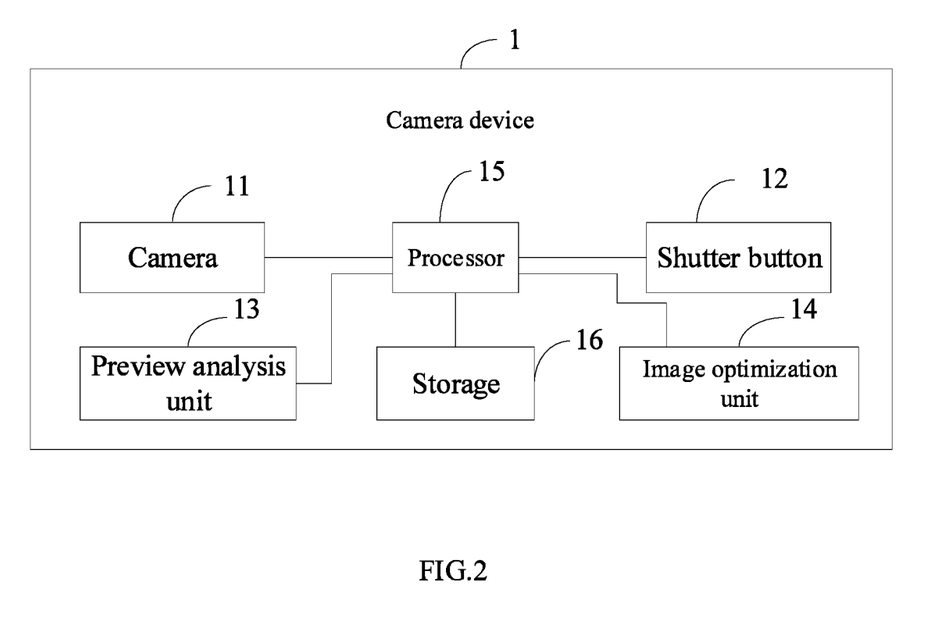
FIG. 2 is a block diagram of an embodiment of a camera device.

FIG. 2 illustrates the camera device 1. The camera device 1 includes a camera 11, a shutter button 12, a preview analysis unit 13, an image optimization unit 14, a processor 15, and a storage 16. The processor 15 connects to the camera 11, the shutter button 12, the preview analysis unit 13, the image optimization unit 14, and the storage 16. In one embodiment, the camera 11 is used to take photographs, for example, the camera 11 may take photographs of a target object in a scene where the target object is moving. The shutter button 12 controls the camera 11 to take images. The preview analysis unit 13 is used to obtain multiple preview images of the camera 11 in preview mode, identify a target object in the preview images, and determine whether the target object is a moving or shape-changing object (dynamic object). The image optimization unit 14 identifies a fuzzy area of a photographing image taken by the camera device 1 when the preview image includes the dynamic object, determines a feature image corresponding to a position of the fuzzy area from the preview image and combines the feature image with the photographing image to generate a target image. In one embodiment, the preview analysis unit 13 and the image optimization unit 14 are embedded in the processor 15.

In one embodiment, the storage 16 stores data or soft code of the camera device 1. In one embodiment, the storage 16 stores images. In one embodiment, the storage 16 can be an internal storage system of the camera device 1, such as a flash memory, a random access memory (RAM) for the temporary storage of information, and/or a read-only memory (ROM) for permanent storage of information. In another embodiment, the storage 16 can also be an external storage system of the camera device 1, such as a hard disk, a storage card, or a data storage medium. In one embodiment, the processor 15 can be a central processing unit, a common processor, a digital signal processor, a dedicated integrated circuit, a ready-made programmable gate array, another programmable logic device, a discrete door or transistor logic device, a discrete hardware component, or the like. In another embodiment, the processor 15 can be any conventional processor. The processor 15 can also be a control center of the camera device 1, using various interfaces and lines to connect the various parts of the camera device 1.

Figure 3:
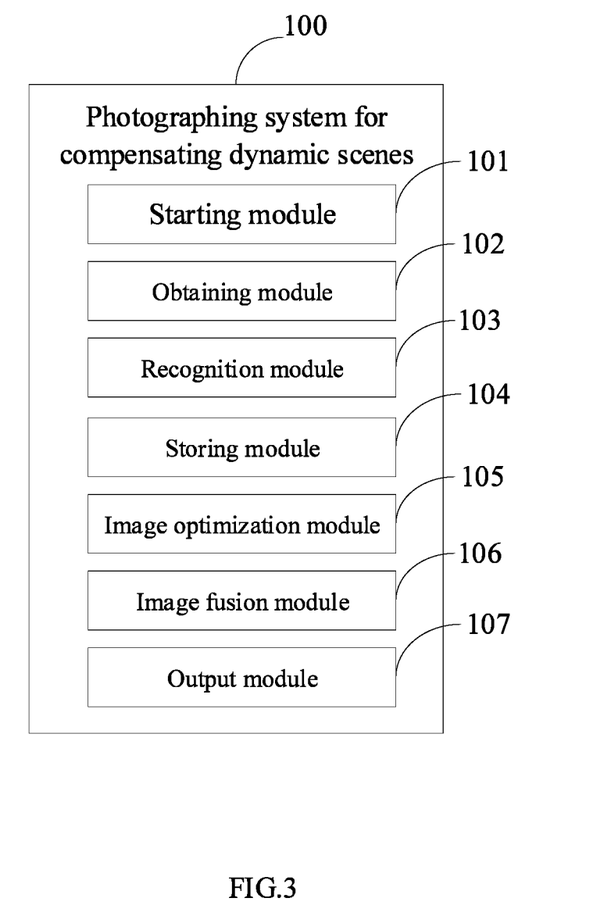
FIG. 3 is a block diagram of a photographing system for compensating dynamic scenes.

FIG. 3 illustrates the photographing system 100 for compensating dynamic scenes. The system 100 includes a starting module 101, an obtaining module 102, a recognition module 103, a storing module 104, an image optimization module 105, an image fusion module 106, and an output module 107. The modules 101-107 of the system 100 can be collections of software instructions. In the present embodiment, the starting module 101, the obtaining module 102, the recognition module 103, the storing module 104, the image optimization module 105, the image fusion module 106, and the output module 107 are stored in the storage 16 of the camera device 1 and executed by the processor 15 of the camera device 1. In another embodiment, the starting module 101, the obtaining module 102, the recognition module 103, the storing module 104, the image optimization module 105, the image fusion module 106, and the output module 107 are program segments or code in the processor 15 of the camera device 1.

The starting module 101 activates the camera 11 and activates the preview mode of the camera 11.

After activation by the starting module 101, the camera device 1 produces preview images. The preview images can be used in the compensation process for details of the images taken by the camera 11.

The obtaining module 102 obtains multiple preview images of the preview mode from the camera 11.

The recognition module 103 identifies a target object in the multiple preview images by the preview analysis unit 13 and determines whether the target object is a dynamic object.

In one embodiment, the recognition module 103 analyzes the motion trajectory of the target object in the multiple preview images by the preview analysis unit 13 to determine whether the target object is a dynamic object. In detail, the recognition module 103 analyzes each of the different positions of the target object in the multiple preview images and determines whether the target object is a dynamic object according to a degree of difference between each position of the target object in the multiple preview images. In one embodiment, when the position of the target object in the multiple preview images changes, the recognition module 103 determines the target object as a dynamic object. If the position of the target object in the multiple preview images does not change, the recognition module 103 determines the target object to be a static object.

The storing module 104 stores a preset plurality of the preview images as first images when determining that the target object is a dynamic object, and stores a second image taken by the camera 11 when the camera 11 receiving an image-capturing instruction.

In one embodiment, a time for generating the preset plurality of the preview images is the closest in time to a time of capturing the second image. The storing module 104 sorts the preset plurality of the preview images to obtain the first images according to a time difference between the time of generating the preset plurality of the preview images and the time of capture of the second image. The preset plurality of the preview images include trajectory and motion details of the dynamic object before image-capture by the camera 11. In one embodiment, the preset number is ten.

In one embodiment, the shutter button 12 when triggered generates the image-capturing instruction, and the camera device 1 obtains the second image by the camera 11 according to the image-capturing instruction, and the storage module 104 stores the second image.

The image optimization module 105 divides the first images to obtain a plurality of first sub-images and divides the second image to obtain a plurality of second sub-images by the image optimization unit 14. The plurality of first sub-images in each of the first images is compared with the plurality of second sub-images of the second image by an edge sharpness and a clarity calculation to determine whether the second image has a fuzzy area range. In one embodiment, the time of generating the first images is closest to the time of the shooting of the second image. In one embodiment, the image optimization module 105 compares the plurality of first sub-images in each of the first images with the plurality of second sub-images in the second image to determine a first location area of the dynamic object of the first image and a second location area of the dynamic object of the second image, determines whether the sharpness of the dynamic object of the first image and sharpness of the second image is same by the edge sharpness and the clarity calculation, and determines that the second image has a fuzzy area range when the sharpness of the dynamic object of the first image and the sharpness of the second image is not same.

In one embodiment, when the second image has the fuzzy area range, the image optimization module 105 compares the plurality of first sub-images in each of the first images with the plurality of the second sub-images in the second image to determine feature information in each first image and the feature information in the first images corresponds to the fuzzy area range of the second image.

In one embodiment, when the second image has the fuzzy area range, the image optimization module 105 compares the plurality of first sub-images in each of the first images with the plurality of second sub-images in the second image to determine a target location area of the target object in each first image corresponding to the fuzzy area of the second image. Feature points of the target location area of each of the first images are extracted and feature descriptions of the target location area of each of the first images are characterized to obtain the feature information of the first images.

In one embodiment, a feature point is a visual feature, and such visual feature can include, but is not limited to, an edge of images, outline of images, shape of images, texture of images, and overall area of images. In another embodiment, the feature point can also include statistical features, transformation coefficient features, and one or more algebraic features. In one embodiment, the statistical features include histograms and moment features. The transformation coefficient features can include Fourier depictions and self-regression models. The algebraic feature can include a singular decomposition of image matrices. In another embodiment, the feature points can be a fusion of two or more characteristics including visual features, statistical features, and transformation coefficient features.

In on embodiment, the image optimization module 105 extracts the feature point of the target location area of each of the first images to obtain the feature information of each of the first images by an Oriented FAST and Rotated BRIEF (ORB) algorithm. In one embodiment, the image optimization module 105 takes any point in the target location area of each of the first images as the target point, draws a circle at the center of the target point to generate a feature point circumference including the feature points, and filters out the feature points from the feature point circumference. The image optimization module 105 trains a decision tree by an ID3 algorithm, and filters out an optimal FAST feature point from the feature points according to the decision tree. The image optimization module 105 removes multiple feature points near the FAST feature points by a non-significant value suppression algorithm. The image optimization module 105 sets a scale factor and the number of layers of an image pyramid, zooms out each of the first images into the plurality of sub-images according to the scale factor, extracts a total of the feature points from the plurality of different proportions of the sub-images as an oFAST feature point of each first image. The image optimization module 105 obtains details of changes of the feature point of each of the first images by describing the oFAST feature point, and obtains a pixel position having a largest grayscale value from the oFAST feature point, and calculates the feature information of the feature point by using the edge sharpness and the clarity calculation according to the pixel position having a largest grayscale value from the oFAST feature point.

In detail, the image optimization module 105 takes any point in the target location area of each of the first images as the target point, draws a circle with a radius of 3 pixels at the center of the target point to generate the feature point circumference, wherein a plurality of grayscale values of n continuous pixels is larger or smaller than the grayscale value of the target point. The target point is then considered to be the feature point, where n is set to 12. The image optimization module 105 trains the decision tree by the ID3 algorithm, and filters out an optimal FAST feature point by entering 16 pixels of the feature point circumference into the decision tree, calculates a value of response of each feature point, the response value of each feature point being a total of absolute values of a plurality of deviations between the feature point and 16 other feature points around the feature point. The feature point with a larger response value is retained, and other feature points with smaller response values are removed. The image optimization module 105 sets the scale factor and the number of the image pyramid layers, zooms out each of the first images into the plurality of the sub-images according to the scale factor, and extracts a total of the feature points from the plurality of different proportions of the sub-images as an oFAST feature point of each first image. The image optimization module 105 determines a direction of the oFAST feature point by using a moment method. In detail, the image optimization module 105 calculates a centroid of the feature point within a radius range of r, and a vector from the coordinates of the feature point form to the centroid as the direction of the feature point. The image optimization module 105 obtains the pixel position having the largest grayscale value from the oFAST feature point, and calculates the feature information of the feature point by using the edge sharpness and the clarity calculation according to the pixel position having a largest grayscale value from the oFAST feature point.

In one embodiment, when the second image includes the fuzzy area range, the image optimization module 105 determines whether a size of the fuzzy area range of the second image is within a preset dimension. When the size of the fuzzy area range of the second image is within the preset dimension, the output module 107 outputs the second image. In one embodiment, the preset dimension can be a fixed value. In other embodiments, the preset dimensions can be set as a value according to actual needs.

The image fusion module 106 determines the feature information in at least one first image and having a highest similarity with the fuzzy region range as the target feature information, and combines the target feature information with the second image to generate a target image. In one embodiment, the image fusion module 106 combines the target feature information with the second image by a Laplace image fusion algorithm to generate the target image.

The output module 107 outputs the target image.

Figure 4:
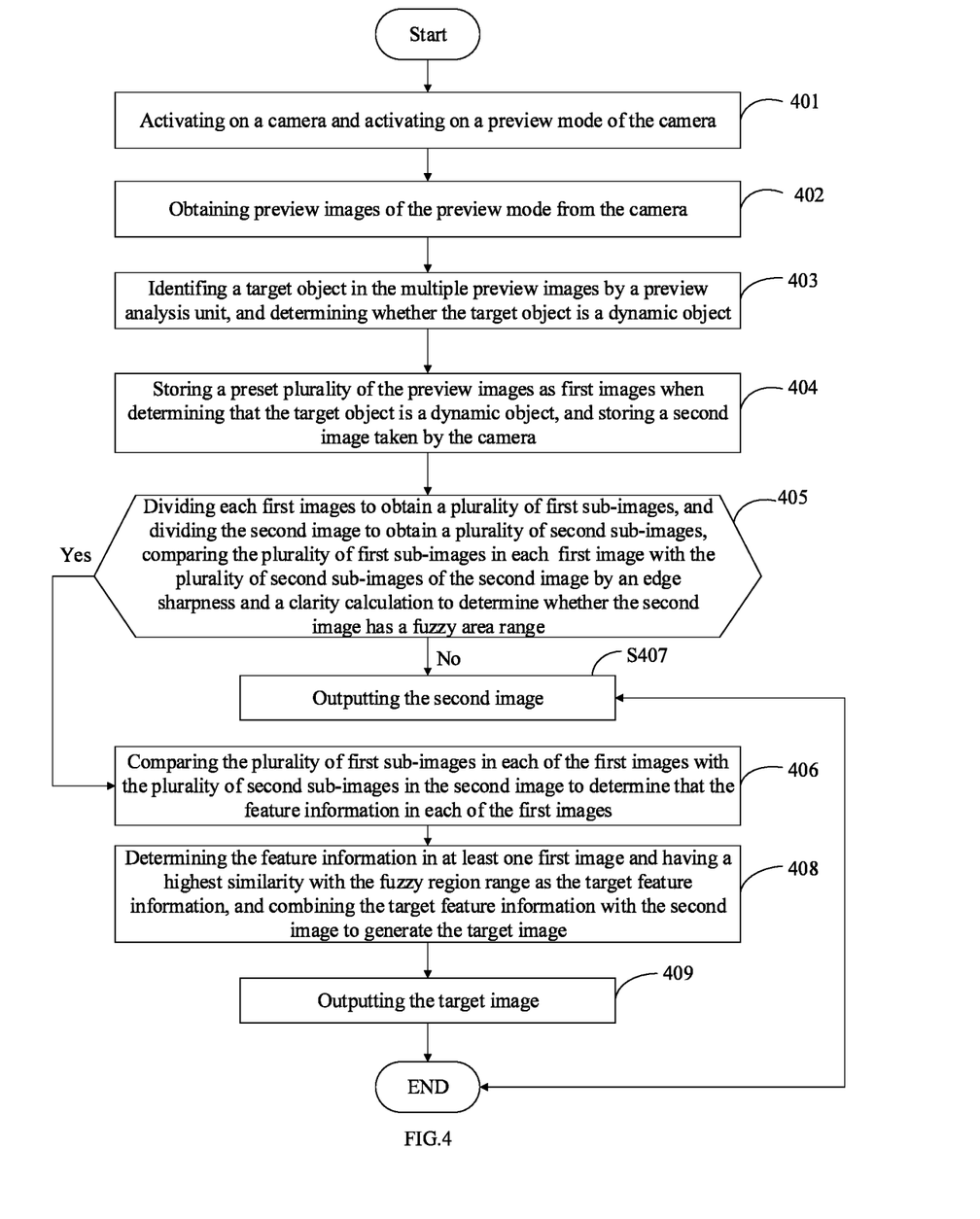
FIG. 4 is a flowchart of an embodiment of a photographing method for compensating dynamic scenes.

FIG. 4 illustrates a flowchart of an embodiment of a photographing method for compensating dynamic scenes. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, a camera device activates a camera and activates a preview mode of the camera.

At block 402, the camera device obtains multiple preview images of the preview mode from the camera.

At block 403, the camera device identifies a target object in the multiple preview images by a preview analysis unit, and determines whether the target object is a dynamic object.

In one embodiment, the camera device analyzes the motion trajectory of the target object in the multiple preview images by the preview analysis unit to determine whether the target object is a dynamic object. In detail, the camera device analyzes each position of the target object in the multiple preview images and determines whether the target object is a dynamic object according to each position of the target object in the multiple preview images. In one embodiment, when the position of the target object in the multiple preview images changes, the camera device determines the target object to be a dynamic object, when the position of the target object in the multiple preview images does not change, the camera device determines the target object to be a static object.

At block 404, the camera device stores a preset plurality of the preview images as first images when determining that the target object is a dynamic object, and stores a second image taken by the camera when the camera receiving an image-capturing instruction.

In one embodiment, a time for generating the preset plurality of the preview images is the closest in time to a time of capturing the second image. The camera device sorts the preset plurality of the preview images to obtain the first images according to a time difference between the time of generating the preset plurality of the preview images and the time of capture of the second image. The preset plurality of the preview images include trajectory and motion details of the dynamic object before image-capture by the camera. In one embodiment, the preset number is ten.

In one embodiment, a shutter button of the camera device when triggered generates the image-capturing instruction, and the camera device obtains the second images by the camera according to the image-capturing instruction, and the camera device stores the second image.

At block 405, the camera device divides the first images to obtain a plurality of first sub-images and divides the second image to obtain a plurality of second sub-images, the device compares the plurality of first sub-images in each first image with the plurality of second sub-images of the second image by an edge sharpness and a clarity calculation to determine whether the second image has a fuzzy area range. In one embodiment, the time of generating the first images is closest to the time of the shooting of the second image. In one embodiment, the camera device compares the plurality of first sub-images in each first image with the plurality of second sub-images in the second image to determine a first location area of the dynamic object of the first image and a second location area of the dynamic object of the second image, determines whether the sharpness of the dynamic object of the first image and sharpness of the second image is same by the edge sharpness and the clarity calculation, and determines that the second image has a fuzzy area range when the sharpness of the dynamic object of the first image and the sharpness of the second image is not the same. When the second image has a fuzzy area range, block 406 is executed, when the second image does not have a fuzzy area range, block 407 is executed.

At block 406, the camera device compares the plurality of first sub-images in each of the first images with the plurality of second sub-images in the second image to determine that the feature information in each of the first images and the feature information in each of the first images corresponds to the fuzzy area range of the second image.

At block 407, the camera device outputs the second image.

In one embodiment, when the second image has the fuzzy area range, the camera device compares the plurality of the first sub-images in each of the first images with the plurality of the second sub-images in the second image to determine a location area of the target object in each first image corresponding to the fuzzy area of the second image and extracts feature points of the target location area of each of the first images and characterizes a feature description of the target location area of each of the first images to obtain feature the information of each of the first images.

In one embodiment, the feature point is a visual feature, and the visual feature includes, but is not limited to, an edge of images, outline of images, shape of images, texture of images, and area of images. In another embodiment, the feature point also includes statistical features, transformation coefficient features, and one or more of the algebraic features. In one embodiment, the statistical features include histograms and moment features. The transformation coefficient features include Fourier depictions and self-regression models. The algebraic feature includes a singular decomposition of image matrices. In another embodiment, the feature points are a fusion of two or more characteristics including visual features, statistical features, and transformation coefficient features.

In on embodiment, the camera device extracts the feature points of the target location area of each of the first images to obtain the feature information of each of the first images by an Oriented FAST and Rotated BRIEF algorithm. In one embodiment, the camera device takes any point in the target location area of each of the first images as the target point, draws a circle at the center of the target point to generate a feature point circumference including the feature points, and filters out the feature points from the feature point circumference. The camera device trains a decision tree by an ID3 algorithm, and filters out an optimal FAST feature point from the feature points according to the decision tree. The camera device removes multiple feature points near the FAST feature points by a non-significant value suppression algorithm. The camera device sets a scale factor and the number of layers of an image pyramid, zooms out each of the first images into the plurality of sub-images according to the scale factor, extracts a total of the feature points from the plurality of different proportions the sub-images as an oFAST feature point of each first image. The camera device obtains changed details of the feature points of each of the first images by describing the oFAST feature point, obtains a pixel position having a largest grayscale value from the oFAST feature point, and calculates the feature information of the feature point by using the edge sharpness and the clarity calculation according to the pixel position having a largest grayscale value from the oFAST feature point.

In detail, the camera device takes any point in the target location area of each of the first images as the target point, draws a circle with a radius of 3 pixels at the center of the target point to generate the feature point circumference, wherein a plurality of grayscale values of n continuous pixels is larger or smaller than the grayscale value of the target point, the target point is then considered to be the feature point, where n is set to 12. The camera device trains the decision tree by the ID3 algorithm, and filters out an optimal FAST feature point by entering 16 pixels of the feature point circumference into the decision tree, calculates a response value of each feature point and the response value of each feature point is a total of absolute values of a plurality of deviations between the feature point and 16 other feature points around the feature point, retains the feature point with a larger response value, and removes other feature points with smaller response values. The camera device sets the scale factor and the number of the image pyramid layers, zooms out each of the first images into the plurality of the sub-images according to the scale factor, and extracts a total of the feature points from the plurality of the sub-images in different proportions as an oFAST feature point of each first images. The camera device determines a direction of the oFAST feature point by using a moment method. In detail, the camera device calculates a centroid of the feature point within a radius range of r, and a vector from the coordinates of the feature point form to the centroid as the direction of the feature point. The camera device obtains the pixel position having the largest grayscale value from the oFAST feature point, and calculates the feature information of the feature point by using the edge sharpness and the clarity calculation according to the pixel position having a largest grayscale value from the oFAST feature point.

In one embodiment, the method further includes: when the second image includes the fuzzy area range, the camera device determines whether a size of the fuzzy area range of the second image is within a preset dimension. When the size of the fuzzy area range of the second image is within the preset dimension, the camera device outputs the second image. In one embodiment, the preset dimension can be a fixed value. It should be noted that in other embodiments, the preset dimensions can also be other values according to actual needs.

At block 408, the camera device determines the feature information in at least one first image and having a highest similarity with the fuzzy region range as the target feature information, and combines the target feature information with the second image to generate the target image.

In one embodiment, the camera device combines the target feature information with the second image by a Laplace image fusion algorithm to generate the target image.

At block 409, the camera device outputs the target image.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A camera device, comprising:
    a camera;
    a preview analysis unit;
    an image optimization unit;
    a processor configured to the camera, the preview analysis unit, and the image optimization unit;
    a non-transitory storage medium coupled to the processor and configured to store a plurality of instructions, which causes the processor to:
        activate the camera and activate a preview mode of the camera;
        obtain preview images of the preview mode from the camera;
        identify a target object in the preview images by the preview analysis unit, and determine whether the target object is a dynamic object;
        store a preset number of the preview images as first images when the target object is a dynamic object, and store a second image taken by the camera when the camera receiving an image-capturing instruction;
        divide each of the first images to obtain a plurality of first sub-images and divide the second image to obtain a plurality of second sub-images by the image optimization unit;
        compare the plurality of first sub-images in each of the first images with the plurality of second sub-images of the second image by an edge sharpness and a clarity calculation to determine whether the second image has a fuzzy area range;
        compare the plurality of first sub-images in each of the first images with the plurality of the second sub-images in the second image to determine feature information in the first images and the feature information corresponds to the fuzzy area range of the second image;
        determine the feature information having a highest similarity with the fuzzy region range as the target feature information, and combines the target feature information with the second image to generate the target image;
        output the target image.

2. The camera device according to claim 1, wherein the plurality of instructions is further configured to cause the processor to:
    when the second image doesn't have a fuzzy area range, output the second image.

3. The camera device according to claim 1, wherein the plurality of instructions is further configured to cause the processor to:
    analyze each position of the target object in the preview images;
    determine whether the target object is a dynamic object according to each position of the target object in the preview images;
    when the position of the target object in the preview images changes, determine the target object as a dynamic object; and
    when the position of the target object in the preview images doesn't change, determine the target object to be a static object.

4. The camera device according to claim 1, wherein the plurality of instructions is further configured to cause the processor to:
    combine the target feature information with the second image by a Laplace image fusion algorithm to generate the target image.

5. The camera device according to claim 1, wherein the plurality of instructions is further configured to cause the processor to:
    compare the plurality of the first sub-images in each of the first images with the plurality of the second sub-images in the second image to determine a target location area of the target object corresponding to the fuzzy area of the second image; and
    extract feature points of the target location area of each of the first images and characterize a feature description of the target location area of each of the first images to obtain the feature information of the first images.

6. The camera device according to claim 5, wherein the plurality of instructions is further configured to cause the processor to:
    extract the feature points of the target location area of each of the first images to obtain the feature information of the first images by an Oriented FAST and Rotated BRIEF algorithm.

7. The camera device according to claim 6, wherein the plurality of instructions is further configured to cause the processor to:
    take any point in the target location area of each of the first images as the target point, draw a circle at a center of the target point to generate a feature point circumference including the feature points, and filter out the feature points from the feature point circumference;
    train a decision tree by an ID3 algorithm, and filter out an optimal FAST feature point from the feature points according to the decision tree;
    remove multiple feature points near the FAST feature points by a non-significant value suppression algorithm;
    set a scale factor and the number of layers of an image pyramid, zoom out each of the first images into a plurality of sub-images according to the scale factor, extract a total of the feature points from the plurality of the sub-images in different proportions as an oFAST feature point of each first image;
    obtain details of changes of the feature points of each of the first images by describing the oFAST feature point, and obtain a pixel position having a largest grayscale value from the oFAST feature point, and calculate the feature information of the feature point by using the edge sharpness and the clarity calculation according to the pixel position having the largest grayscale value.

8. A photographing method for compensating dynamic scenes, the method comprising:
- activating a camera and activating a preview mode of the camera;
- obtaining preview images of the preview mode from the camera;
- identifying a target object in the preview images by a preview analysis unit, and determining whether the target object is a dynamic object;
- storing a preset number of the preview images as first images when the target object is a dynamic object, and storing a second image taken by the camera when the camera receiving an image-capturing instruction;
- dividing each of the first images to obtain a plurality of first sub-images and dividing the second image to obtain a plurality of second sub-images by an image optimization unit;
- comparing the plurality of first sub-images in each of the first images with the plurality of second sub-images of the second image by an edge sharpness and a clarity calculation to determine whether the second image has a fuzzy area range;
- comparing the plurality of first sub-images in each of the first images with the plurality of the second sub-images in the second image to determine feature information in the first images and the feature information corresponding to the fuzzy area range of the second image;
- determining the feature information having a highest similarity with the fuzzy region range as the target feature information, and combining the target feature information with the second image to generate the target image;
- outputting the target image.

9. The photographing method for compensating dynamic scenes according to claim 8, further comprising:
- outputting the second image when the second image doesn't have a fuzzy area range.

10. The photographing method for compensating dynamic scenes according to claim 8, further comprising:
- analyzing each position of the target object in the preview images;
- determining whether the target object is a dynamic object according to each position of the target object in the preview images;
- determining the target object as a dynamic object when the position of the target object in the preview images changes; and
- determining the target object to be a static object when the position of the target object in the preview images doesn't change.

11. The photographing method for compensating dynamic scenes according to claim 8, further comprising:
- comparing the plurality of the first sub-images in each of the first images with the plurality of the second sub-images in the second image to determine a target location area of the target object corresponding to the fuzzy area of the second image; and
- extracting feature points of the target location area of each of the first images and characterizing a feature description of the target location area of each of the first images to obtain the feature information of the first images.

12. The photographing method for compensating dynamic scenes according to claim 11, further comprising:
- extracting the feature points of the target location area of each of the first images to obtain the feature information of the first images by an Oriented FAST and Rotated BRIEF algorithm.

13. The photographing method for compensating dynamic scenes according to claim 12, further comprising:
- taking any point in the target location area of each of the first images as the target point, drawing a circle at a center of the target point to generate a feature point circumference including the feature points, and filtering out the feature points from the feature point circumference;
- training a decision tree by an ID3 algorithm, and filtering out an optimal FAST feature point from the feature points according to the decision tree;
- removing multiple feature points near the FAST feature points by a non-significant value suppression algorithm;
- setting a scale factor and the number of layers of an image pyramid, zooming out each of the first images into a plurality of sub-images according to the scale factor, extracting a total of the feature points from the plurality of the sub-images in different proportions as an oFAST feature point of each first image;
- obtaining details of changes of the feature points of each of the first images by describing the oFAST feature point, and obtaining a pixel position having a largest grayscale value from the oFAST feature point, and calculating the feature information of the feature point by using the edge sharpness and the clarity calculation according to the pixel position having the largest grayscale value.

14. The photographing method for compensating dynamic scenes according to claim 12, further comprising:
- combining the target feature information with the second image by a Laplace image fusion algorithm to generate the target image.

15. A non-transitory storage medium having stored thereon instructions that, when executed by at least one processor of a camera device, causes the least one processor to execute instructions of a photographing method for compensating dynamic scenes, the photographing method for compensating dynamic scenes comprising:
- activating a camera and activating a preview mode of the camera;
- obtaining preview images of the preview mode from the camera;
- identifying a target object in the preview images by a preview analysis unit, and determining whether the target object is a dynamic object;
- storing a preset number of the preview images as first images when the target object is a dynamic object, and storing a second image taken by the camera when the camera receiving an image-capturing instruction;
- dividing each of the first images to obtain a plurality of first sub-images and dividing the second image to obtain a plurality of second sub-images by an image optimization unit;
- comparing the plurality of first sub-images in each of the first images with the plurality of second sub-images of the second image by an edge sharpness and a clarity calculation to determine whether the second image has a fuzzy area range;
- comparing the plurality of first sub-images in each of the first images with the plurality of the second sub-images in the second image to determine feature information in the first images and each characteristic information corresponding to the fuzzy area range of the second image;

determining the feature information having a highest similarity with the fuzzy region range as the target feature information, and combining the target feature information with the second image to generate the target image;

outputting the target image.

16. The non-transitory storage medium according to claim 15, wherein the photographing method for compensating dynamic scenes further comprising:

outputting the second image when the second image doesn't have a fuzzy area range.

17. The non-transitory storage medium according to claim 15, wherein the photographing method for compensating dynamic scenes further comprising:

analyzing each position of the target object in the preview images;

determining whether the target object is a dynamic object according to each position of the target object in the preview images;

determining the target object as a dynamic object when the position of the target object in the preview images changes; and determining the target object to be a static object when the position of the target object in the preview images doesn't change.

18. The non-transitory storage medium according to claim 15, wherein the photographing method for compensating dynamic scenes further comprising:

combining the target feature information with the second image by a Laplace image fusion algorithm to generate the target image.

19. The non-transitory storage medium according to claim 15, wherein the photographing method for compensating dynamic scenes further comprising:

comparing the plurality of the first sub-images in each of the first images with the plurality of the second sub-images in the second image to determine a target location area of the target object corresponding to the fuzzy area of the second image; and extracting feature points of the target location area of each of the first images and characterizing a feature description of the target location area of each of the first images to obtain the feature information of the first images.

20. The non-transitory storage medium according to claim 19, wherein the photographing method for compensating dynamic scenes further comprising:

extracting the feature points of the target location area of each of the first images to obtain the feature information of the first images by an Oriented FAST and Rotated BRIEF algorithm.

* * * * *